UNITED STATES PATENT OFFICE.

AUGUSTUS WM. HOFMANN, OF FITZROY SQUARE, COUNTY OF MIDDLESEX, ENGLAND.

IMPROVEMENT IN PREPARING COLORING-MATTERS FOR DYEING AND PRINTING.

Specification forming part of Letters Patent No. 43,066, dated June 7, 1864.

*To all whom it may concern:*

Be it known that I, AUGUSTUS WILLIAM HOFMANN, of Fitzroy Square, in the county of Middlesex, England, F. R. S., professor in the Royal College of Chemistry, a subject of the Queen of Great Britain, have invented or discovered new and useful Improvements in Preparing Coloring-Matters for Dyeing and Printing; and I, the said AUGUSTUS WILLIAM HOFMANN, do hereby declare the nature of the said invention and in what manner the same is to be performed to be particularly described and ascertained in and by the following statement thereof—that is to say:

This invention has for its object improvements in preparing coloring-matters for dyeing and printing. For these purposes I take the substance now well known as "rosaniline," being the base obtained from the various salts of rosaniline found in commerce under the names of "roseine," "magenta," and also by other names, and which is usually prepared from aniline and the homologues thereof. I mix it with the iodides or bromides of the "alcohol radicals," such as iodides of ethyl, methylamylpropyl or capryl, or bromides of the same.

I employ the substances, by preference, in the proportion of one equivalent of rosaniline to three equivalents of the salt of the alcohol radical. I then heat the mixture, either alone or together with spirit, to a temperature of 212° (or it may be somewhat higher) in a close vessel, under pressure. It is convenient to use an iron boiler provided with a safety-valve. I continue the heat until the desired result is obtained. During the heating the mixture passes through several phases of coloration, being eventually converted into a violet or blue-violet substance. Within certain limits, the longer the process is continued the bluer the mixture will become.

For the purpose of dyeing and printing the mixture may be used in the same manner as that in which the aniline colors are employed.

The following is the manner in which I prefer to proceed: I take one part, by weight, of rosaniline, two parts, by weight, of iodide of ethyl, and about two parts of strong methylated spirit or alcohol, and I heat these substances together in a suitable close vessel, either of glass or metal capable of sustaining the pressure generated, to a temperature, by preference, of 212° Fahrenheit for three or four hours, or until the whole of the rosaniline is converted into new coloring substance. I then allow it to cool and dissolve the sirupy mass in methylated spirit or alcohol, which alcoholic solution may be used for dyeing and printing in the same manner as that in which other ordinary aniline colors are employed; or, in order to recover the iodine, which is a somewhat expensive substance, I take the product, either before or after dissolving it in spirit, and boil it with an alkali, and I then obtain the base of the new color in the insoluble portion, while the iodine is held in solution as a soluble iodide. I then wash the base free from all salts and dissolve it, together with another acid—such as hydrochloric acid—in alcohol, and employ this alcoholic solution in the manner before described; or, in place of hydrochloric acid and alcohol, I use acetic acid and water, and employ this aqueous solution for dyeing or printing. By this process I process a new coloring-matter which dyes silk and wool of a beautiful violet-blue, violet, or red-violet tint.

In place of the iodide of ethyl, the iodides of methylamyl and propylcapryl and the bromides of ethylmethylamyl and propylcapryl may be employed; but not so conveniently, as they are more expensive.

Having thus described the nature of my said invention and the manner of performing the same, I would have it understood that I do not confine myself to the exact details of the process hereinbefore given; but

What I claim is—

The production of new coloring substances by the action of the iodides and bromides of alcohol radicals on rosaniline, as hereinbefore described.

A. W. HOFMANN.

Witnesses:
 THOMAS LAKE,
 F. W. HAWS,
*Both of No. 17 Gracechurch Street, London, E. C.*